(12) United States Patent
Takahashi

(10) Patent No.: US 6,974,257 B2
(45) Date of Patent: Dec. 13, 2005

(54) DYNAMIC PRESSURE BEARING

(75) Inventor: Takeshi Takahashi, Kashiba (JP)

(73) Assignee: Koyo Seiko Co., Ltd., Osaka-fu (JP)

( * ) Notice: Subject to any disclaimer, the term of this patent is extended or adjusted under 35 U.S.C. 154(b) by 190 days.

(21) Appl. No.: 10/331,080

(22) Filed: Dec. 27, 2002

(65) Prior Publication Data
US 2003/0123763 A1 Jul. 3, 2003

(30) Foreign Application Priority Data
Dec. 28, 2001 (JP) .............................. 2001-400802

(51) Int. Cl.$^7$ ............................................. F16C 17/02
(52) U.S. Cl. .................................. 384/114; 384/912
(58) Field of Search ........................ 384/107–120, 384/912

(56) References Cited

U.S. PATENT DOCUMENTS 6,010,246 A * 1/2000 Gomyo et al. .............. 384/115
6,206,572 B1 3/2001 Kobayashi et al.

FOREIGN PATENT DOCUMENTS

| JP | 04-046218 | 2/1992 |
| JP | 09-177767 | 7/1997 |
| JP | 11-223214 | 8/1999 |

* cited by examiner

Primary Examiner—Lenard A. Footland
(74) Attorney, Agent, or Firm—Jordan and Hamburg LLP

(57) ABSTRACT

A dynamic pressure bearing is provided in which required performances such as corrosion resistance and wear resistance in the use of a hard disk drive or the like are realized without application of any coating such as Ni plating that easily causes a failure, thereby exhibiting stable performances for a long time with a high production yield. As solving means for the above, the material of a sleeve is set to a copper alloy which contains a brass composed essentially of copper (Cu) and zinc (Zn), and silicon (Si), and which does not contain a low-melting soft metal component. A hard phase consisting of a compound of brass and silicon, and a soft phase consisting of brass are mixedly present in a matrix form. According to the configuration, the free-cutting property, the wear resistance, and the corrosion resistance are improved, and a coating by hard Ni plating or the like is not required. Since a low-melting soft metal component is not contained, a working fluid is prevented from being deteriorated.

14 Claims, 2 Drawing Sheets

DYNAMIC PRESSURE BEARING

BACKGROUND OF THE INVENTION

The present invention relates to a dynamic pressure bearing, and more particularly to a dynamic pressure bearing which is suitably used in a part where corrosion resistance is requested, such as a hard disk drive.

In recent years, dynamic pressure bearings are often used as bearings for an apparatus in which rotation at high speed with high accuracy is required. In a dynamic pressure bearing, generally, a working fluid such as lubricating oil is poured into a space between a shaft and a bearing, and fine dynamic pressure grooves are formed on either one of the shaft or the bearing. The pressure of the working fluid is raised by means of a pumping action or the like caused by the relative rotation of the shaft and the bearing. By means of the pressure, the shaft is supported in a relatively rotatable manner under a substantially non-contact condition with respect to the bearing (for example, see Patent literature 1).

A known suitable application of such a dynamic pressure bearing is a dynamic pressure bearing in a hard disk drive. The dynamic pressure bearing in this use usually adopts a structure in which dynamic pressure generating grooves of, for example, a herringbone pattern are formed in an inner peripheral face of a sleeve, and a shaft is passed through the inside of the sleeve. For such a dynamic pressure bearing to be used in a hard disk drive, facility in working, a sliding characteristic, wear resistance, and corrosion resistance are particularly required. In order to satisfy the requirements, a conventional dynamic pressure bearing for a hard disk drive adopts a structure in which a Cu-Zn copper alloy such as brass is used as a base material, and a coating layer of hard Ni plating is formed on the surface.

Patent literature 1... Japanese Patent Publication (Kokai) No. 11-223214

In accordance with speeding up and miniaturization, recently, a dynamic pressure bearing is requested to have high working accuracy such as size accuracy of the inner diameter (the clearance with respect to the shaft). In the case where Ni plating is applied to the surface as described above, therefore, there arises a problem in that the production yield is lowered because of dispersion in thickness of the plating layer.

In order to solve the problem, a coatingless structure has been studied. In the same manner as an existing copper alloy, conventionally, a copper alloy which is to be used in a dynamic pressure bearing contains a soft metal component having a low melting point which is easily separated and dispersed as a result of supersaturation, such as Pb or Bi in order to improve the free-cutting property. Accordingly, it has been pointed out that the low-melting metal which is separated and dispersed, such as Pb or Bi dissolves in the working fluid of the dynamic pressure bearing, whereby the working fluid is deteriorated to cause a lubrication failure. In addition, a copper alloy such as brass is not regarded as satisfying the requirements of the wear resistance and the corrosion resistance.

SUMMARY OF THE INVENTION

It is an object of the invention to provide a dynamic pressure bearing in which required performances such as corrosion resistance and wear resistance in the use of a hard disk drive or the like are realized without performing any coating such as Ni plating that easily causes a failure, thereby exhibiting stable performances for a long time with a high production yield.

In order to attain the object, the dynamic pressure bearing of the invention is characterized in that, in a dynamic pressure bearing in which dynamic pressure generating grooves are formed in an inner peripheral face of a substantially cylindrical sleeve into which a shaft is relatively rotatably inserted via a working fluid, the sleeve is made of a copper alloy which contains a brass composed essentially of copper (Cu) and zinc (Zn), and 0.5 to 7 wt. % of silicon (Si), and which does not contain a low-melting soft metal component (first invention).

In the invention, a configuration (second invention) in which, in the copper alloy of the sleeve, a content of silicon (Si) is 2.0 to 7 wt. %, and a hard phase consisting of a compound of brass and silicon is mixedly present in a matrix form may be preferably employed.

The invention attains the above-mentioned object by using a copper alloy that can realize free-cutting property, and also wear resistance and corrosion resistance in a boundary lubricating condition, without containing a low-melting soft metal component which will be separated and dispersed as a result of supersaturation such as Pb or Bi.

In the dynamic pressure bearing of the invention, specifically, the ratios of composition in the compounds of copper, and zinc and silicon in the copper alloy are different from each other, so that compounds with different cooling velocities are made into a matrix form, thereby constituting a hard phase and a soft phase. As a result, the free-cutting property, the wear resistance, and the corrosion resistance are realized.

The conditions for good free-cutting property are that chips caused in a cutting process are neither continuous nor long, and that such chips are produced in a shortly divided form in regular cutting. Since the copper alloy used in the dynamic pressure bearing of the invention is in a condition where a hard phase consisting of the compounds of copper, and zinc and silicon, and a soft phase of a brass are mixedly present, chips are not continuous although a low-melting soft metal component which will be separated and dispersed as a result of supersaturation is not contained, but chips are in an appropriately shortly divided form. Thus, good free-cutting property can be attained.

Since the hard phase and the soft phase of copper compounds are mixedly present, the wear amount can be reduced in a boundary lubricating condition of the dynamic pressure bearing, good wear resistance can be attained, and the corrosion resistance can be ensured although any coating of another metal such as Ni is not applied to the surface.

In the dynamic pressure bearing of the invention, even when a coating by hard Ni plating or the like is not applied to the surface, the low-melting soft metal does not dissolve in the working fluid, and the working fluid is not deteriorated, unlike the case in the conventional art where a copper alloy in which Pb or Bi is added to brass is used. According to the invention, therefore, a dynamic pressure bearing can be obtained in which the reduction in production yield due to the variation in thickness of the coating layer by Ni plating or the like is not caused, and which can maintain high performances for a long time.

With respect to the copper alloy which is useful in the dynamic pressure bearing of the invention, $Cu_4ZnSi$ and $Cu_8Zn_2Si$ constitute a hard phases, and are mixedly present in a matrix form in a soft phase of a brass, whereby the copper alloy can be formed as an alloy in which good free-cutting property and wear and abrasion resistance are obtained, and which exhibits superior corrosion resistance.

With respect to the percentage contents of the components of the copper alloy used in the dynamic pressure bearing of the invention, it is important that a hard phase and a soft phase due to the difference in the ratios of composition of the copper compounds are mixedly present in the base structure of the alloy. The soft phase may contain silicon.

In the percentage contents of the metal components in the invention, when Zn is in the range of 5 to 35 wt. % and Si is in the range of 0.5 to 7 wt. %, the above-mentioned hard phase of $Cu_4ZnSi$ and $Cu_8Zn_2Si$ is formed at an effective ratio. It is preferred that lead is not contained. However, lead is inevitably dissolved from a mold and the like during the melting and alloying process, and therefore lead may remain to exist within the solid solubility limit of Cu—Zn—Si. It is preferable that the percentage content of lead be about 0.1 wt. % or less.

In addition, in the invention, when the percentage content of Si is 2.0 wt. % or more, as shown in FIG. 2, the corrosion resistance and the reduction in wear amount as the copper alloy are particularly excellent. When the percentage content of Si is higher than 7 wt. %, the copper alloy itself is excessively hard, and the workability is lowered. FIG. 2 illustrates reductions of the oxidation resistance and the wear amount depending on the percentage content of Si while setting the oxidation resistance and the wear amount of a Cu—Zn alloy without containing Si as 100. As the value of the ordinate is smaller, the reduction effects of the oxidation resistance and the wear amount are more excellent. The oxidation resistance is a numeric representation of the degree at which the color of the surface of the sleeve is changed to black by oxidation.

DETAILED DESCRIPTION OF THE PREFERRED EMBODIMENTS

Hereinafter, an embodiment of the invention will be described with reference to the accompanying drawings.

Figure 1:
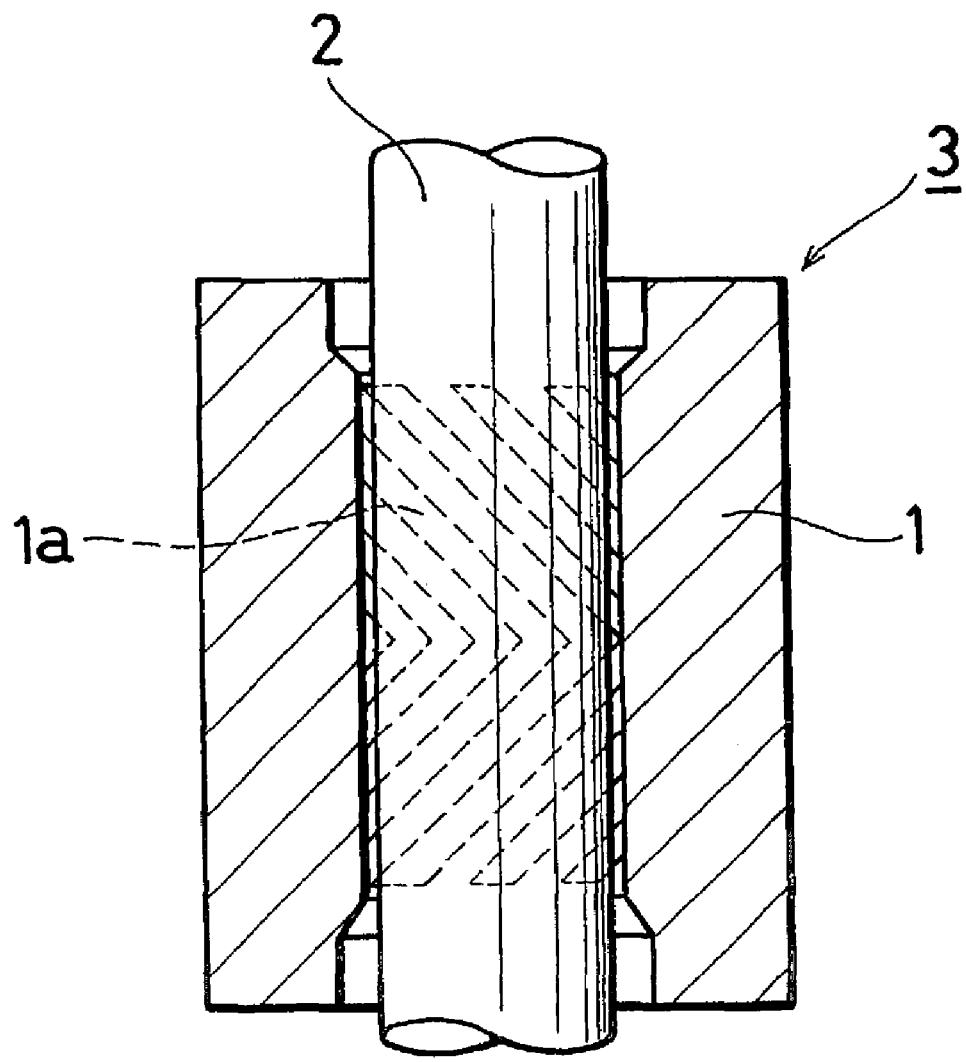
FIG. 1 is a section view of main portions of an embodiment of the invention.
Figure 2:
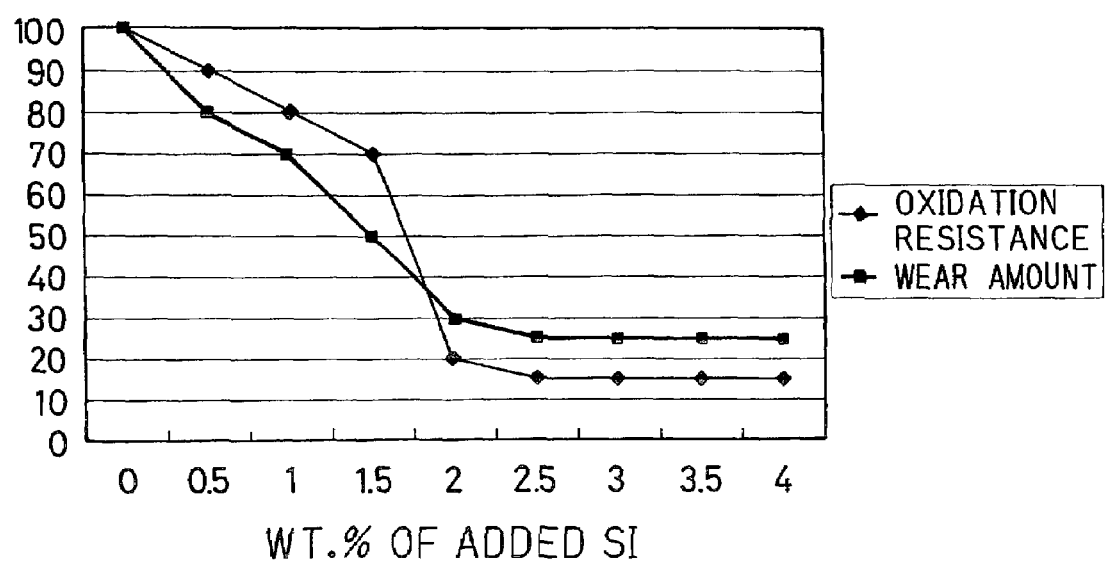
FIG. 2 is a graph showing characteristic variations due to addition of silicon to brass in the invention.

FIG. 1 is a section view of main portions of an embodiment of the invention.

A dynamic pressure bearing 3 includes a sleeve 1 and a shaft 2. Dynamic pressure generating grooves 1a of, for example, a herringbone pattern are formed in the inner peripheral face of the sleeve 1. The shaft 2 is rotatably inserted into the sleeve 1. The outer peripheral face of the shaft 2 which is opposed to the dynamic pressure generating grooves 1a is a uniform cylindrical face. A space between the sleeve 1 and the shaft 2 is filled with a working fluid (not shown) such as lubricating oil.

In the above configuration, when the shaft 2 and the sleeve 1 are relatively rotated, a high pressure is generated in the working fluid by a pumping action and the like of the dynamic pressure generating grooves 1a. As a result, the shaft 2 and the sleeve 1 can be relatively rotated while maintaining the non-contact condition therebetween.

The sleeve 1 is made of a material in which Si is added to brass composed essentially of Cu and Zn. The material does not contain a soft metal component having low melting point which will be separated and dispersed due to super-saturation, such as Pb or Bi. In the copper alloy forming the sleeve 1, the state where $Cu_4ZnSi$ and $Cu_8Zn_2Si$ are mixedly present in the base structure, i.e., that where a hard phase and a soft phase are mixedly present due to difference in cooling velocities which is caused by the facts that both the compounds are copper compounds, and that combining ratios of the compounds are different from each other. No coating is applied to the surface of the sleeve 1.

An example of a method of processing the sleeve of the dynamic pressure bearing of the invention will be described. A copper alloy is melted and alloyed, and then extrusion molded into a rod-like shape. The rod-like molded material is then tempered at about 400° C. After the tempering, the material is rolled so has to have a predetermined section shape, thereby obtaining a cutting material. The cutting material is subjected to a cut process to produce the sleeve. In the method, the hard phase is dispersed by the process of tempering the copper alloy, and the particle size of the hard phase is reduced by the rolling process.

The material of the shaft 2 is not particularly restricted. Stainless steel (austenitic or martensitic stainless steel) or high carbon steel, or an alloy of another kind may be used.

According to the sleeve 1 in the above-described embodiment of the invention, in the base structure of the copper alloy which is the material of the sleeve, a hard phase and a soft phase formed by of the copper alloys are mixedly present. Therefore, the free-cutting property is so excellent that working with high accuracy can be performed, and the wear can be suppressed even in the boundary lubricating condition. In addition, a low-melting soft metal does not dissolve in the working fluid such as lubricating oil. The corrosion resistance and the wear resistance are superior, and stable performances can be exhibited for a long time. Moreover, a coating by Ni plating or the like is not applied to the surface, and hence there is no possibility that the production yield is reduced because of the variation in coating thickness.

As described above, according to the invention, the material of the sleeve in which the dynamic pressure generating grooves are formed is a copper alloy in which a hard phase and a soft phase caused by difference in combining ratios of the copper compounds are mixedly present. Thus, it is possible to obtain a dynamic pressure bearing in which, unlike the conventional art, the corrosion resistance and the wear resistance are superior without application of a coating by hard Ni plating or the like on the surface of an existing copper alloy, and stable performances can be maintained for a long time without deteriorating the working fluid, and which is suitably used as a radial bearing or the like in a hard disk drive. Moreover, since the free-cutting property is superior and any plating is not applied to the surface, the bearing can be relatively easily produced, and high production yield can be attained.

What is claimed is:

1. A dynamic pressure bearing comprising:
a substantially cylindrical sleeve into which a shaft is relatively rotatably inserted via a working fluid, said sleeve including a an inner peripheral face;
dynamic pressure generating grooves being formed in said inner peripheral face of said substantially cylindrical sleeve; and
wherein:
said sleeve comprises a copper alloy which contains a brass, said brass comprising copper (Cu) and zinc (Zn), and 0.5 to 7 wt. % of silicon (Si), and said copper alloy does not contain a low-melting metal component which is separated and dispersed in said copper alloy due to super-saturation.

2. The bearing of claim 1, wherein, in said copper alloy of said sleeve, a content of silicon (Si) is 2.0 to 7 wt. %, and a hard phase consisting of a compound of brass and silicon is mixedly present in a matrix form.

3. A dynamic pressure bearing comprising:
a substantially cylindrical sleeve into which a shaft is relatively rotatably inserted via a working fluid, said sleeve including a an inner peripheral face;
dynamic pressure generating grooves being formed in said inner peripheral face of said substantially cylindrical sleeve; and
wherein:
said sleeve comprises a copper alloy which contains a brass, said brass comprising copper (Cu) and zinc (Zn), and 0.5 to 7 wt. % of silicon (Si), and said copper alloy does not contain a low-melting metal component which is separated and dispersed in said copper alloy due to super-saturation, said brass exceeding a solid solubility limit of said copper alloy.

4. The bearing of claim 3, wherein, in said copper alloy of said sleeve, a content of silicon (Si) is 2.0 to 7 wt. %, and a hard phase consisting of a compound of brass and silicon are mixedly present in a matrix form.

5. A dynamic pressure bearing comprising:
a substantially cylindrical sleeve into which a shaft is relatively rotatably inserted via a working fluid, said sleeve including a an inner peripheral face;
dynamic pressure generating grooves being formed in said inner peripheral face of said substantially cylindrical sleeve; and
wherein:
said sleeve comprises of a copper alloy which contains a brass, said brass comprises copper (Cu) and zinc (Zn), and 0.5 to 7 wt. % of silicon (Si), and which does not contain bismuth (Bi).

6. The bearing of claim 5, wherein, in said copper alloy of said sleeve, a content of silicon (Si) is 2.0 to 7 wt. %, and a bard phase consisting of a compound of brass and silicon are mixedly present in a matrix form.

7. The bearing of claim 5, wherein said copper alloy of said sleeve does not contain lead (Pb) exceeding 0.1 wt %.

8. A dynamic pressure bearing comprising:
a substantially cylindrical sleeve into which a shaft is relatively rotatably inserted via a working fluid, said sleeve including a an inner peripheral face;
dynamic pressure generating grooves being formed in said inner peripheral face of said substantially cylindrical sleeve; and
wherein:
said sleeve comprises a copper alloy which contains a brass composed essentially of copper (Cu) and zinc (Zn), and 0.5 to 7 wt. % of silicon (Si), and which does not contain bismuth (Li) with exceeding a solid solubility limitof said copper alloy.

9. The bearing of claim 8, wherein, in said copper alloy of said sleeve, a content of silicon (Si) is 2.0 to 7 wt. %, and a hard phase consisting of a compound of brass and silicon are mixedly present in a matrix form.

10. The bearing of claim 8, wherein said copper alloy of said sleeve does not contain lead (Pb) exceeding a solid solubility limit of said copper alloy.

11. A dynamic pressure bearing comprising:
a substantially cylindrical sleeve into which a shaft is relatively rotatably inserted via a working fluid, said sleeve including a an inner peripheral face;
dynamic pressure generating grooves being formed in said inner peripheral face of said substantially cylindrical sleeve; and
wherein:
said sleeve comprises copper alloy which contains a brass, said brass comprising copper (Cu) and zinc (Zn), and 0.5 to 7 wt. % of silicon (Si), and which does not contain lead (Pb) with exceeding 0.1 wt %.

12. The bearing of claim 11, wherein, in said copper alloy of said sleeve, a content of silicon (Si) is 2.0 to 7 wt. %, and a hard phase consisting of a compound of brass and silicon are mixedly present in a matrix form.

13. A dynamic pressure bearing comprising:
a substantially cylindrical sleeve into which a shaft is relatively rotatably inserted via a working fluid, said sleeve including a an inner peripheral face;
dynamic pressure gencrating grooves being formed in said inner peripheral face of said substantially cylindrical sleeve; and
wherein:
said sleeve comprises a copper alloy which contains a brass, said brass comprises copper (Cu) and zinc (Zn), and 0.5 to 7 wt. % of silicon (Si), and which does not contain lead (Pb) exceeding a solid solubility limit of said copper alloy.

14. The bearing of claim 13, wherein, in said copper alloy of said sleeve, a content of silicon (Si) is 2.0 to 7 wt. %, and a hard phase consisting of a compound of brass and silicon is mixedly present in a matrix form.

\* \* \* \* \*